United States Patent Office 3,646,114
Patented Feb. 29, 1972

3,646,114
CYCLOPENTA <b> PHENANTHRENE STEROID ANALOGUE
Colin G. Pitt, Duhram, N.C., assignor to Eli Lilly and Company, Indianapolis, Ind.
No Drawing. Filed Dec. 23, 1970, Ser. No. 101,100
Int. Cl. C07c 69/14
U.S. Cl. 260—488 B       3 Claims

ABSTRACT OF THE DISCLOSURE

This invention is addressed to novel cyclopentanophenanthrene steroid analogues including 8β-acetoxy, 4,5,6,6aβ,7,7aβ,8,9,10,10aα,11,11aα - dodecahydro - 7a-methyl-1H-cyclopenta<b>phenanthrene-3(2H)-one, 8β-acetoxy, 6,6aβ,7,7a,8,9,10,10aα,11,11aα - decahydro - 3-methoxy-7aβ-methyl-5H - cyclopenta<b>phenanthrene and 5,6,6a,7,7a,9-hexahydro-3-methoxy-7a-methyl-8H-cyclopenta<b>phenanthrene-8-ol acetate synthesized from m-methoxyphenylacetic acid.

---

This invention relates to the synthesis of certain novel 2,3-cyclopentanophenanthrene steroid analogues.

It is an object of this invention to produce certain novel steroid analogues containing the perhydro-2,3-cyclopentanophenanthrene ring system.

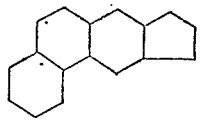

The novel compounds of this invention include

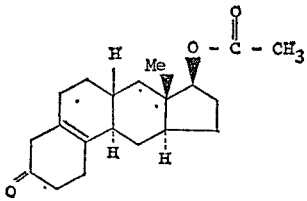

(I)

8β-acetoxy, 4,5,6,6aβ,7,7aβ,8,9,10,10aα,11,11aα - dodecahydro-7a - methyl-1H - cyclopenta<b>phenanthrene-3 (2H)-one, and

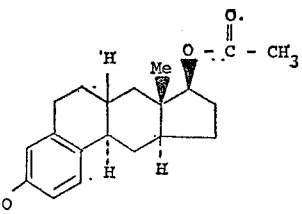

(II)

8β-acetoxy, 6,6aβ,7,7a,8,9,10,10aα,11,11aα - decahydro-3-methoxy-7aβ - methyl-5H - cyclopenta<b>phenanthrene, and

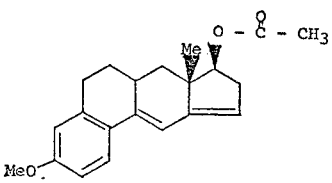

(III)

5,6,6a,7,7a,9-hexahydro-3 - methoxy-7a-methyl-8H-cyclopenta<b>phenanthrene-8-ol acetate.

It has been found in the practice of this invention that the foregoing novel compounds of the invention can be completely synthesized from m-methoxyphenylacetic acid.

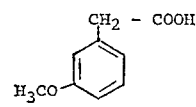

(IV)

This synthesis is outlined below.

m-Methoxyphenylacetic acid is first converted to m-methoxyphenethyl iodide (V) using the procedure of H. Smith, J. Chem. Soc., 4308 (1965) which is, in turn, used to alkylate the potassium salt of ethyl acetoacetate in accordance with the procedure of Robinson, J. Chem. Soc., 1533 (1935) to produce the compound (VI).

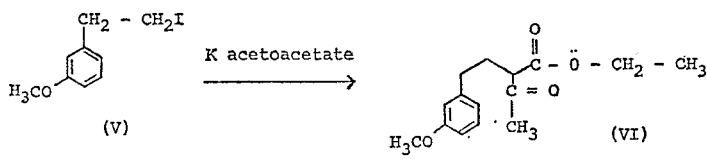

The product (VI) is then reacted with ethylene glycol in the presence of p-toluene sulfonic acid to form the corresponding ketal (VII)

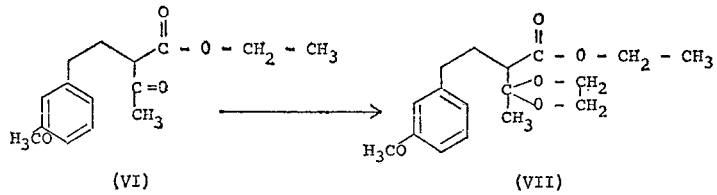

which is then reduced with lithium aluminum hydride to form the hydroxyketal (VIII)

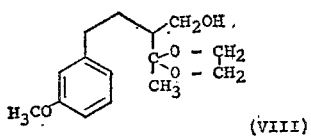

(VIII)

The hydroxyketal (VIII) is then reacted with HCl to form the hydroxyketone (IX) which is then dehydrated to form the vinyl ketone (X).

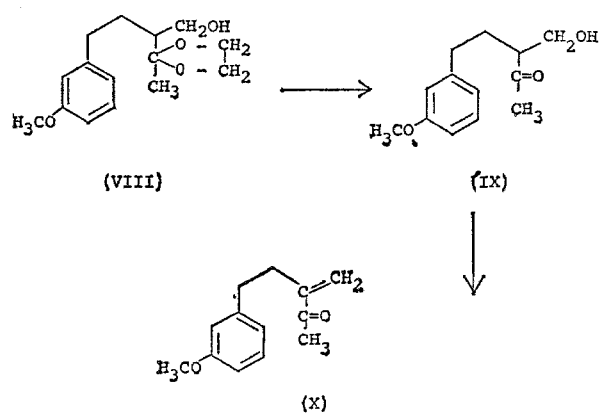

(VIII)    (IX)

(X)

The dehydration of (IX) to form (X) is preferably carried out by refluxing the hydroxy ketone (IX) in pyridine.

The vinyl ketone (X) is then reacted with 2-methylcyclopentane-1,3-dione to form an intermediate which is believed to have the structure (XI) and which can be converted to (XII) by refluxing with benzoic acid and triethylamine as illustrated below.

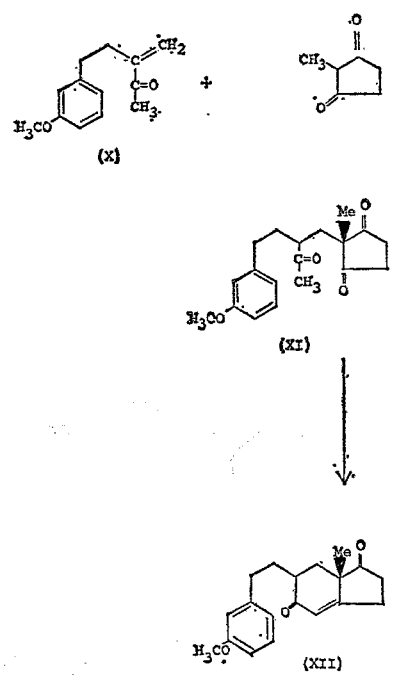

The product (XII) is reacted with an alkali metal borohydride and then acetic anhydride to form the corresponding 8-acetoxy compound (XIII) which cyclizes to form compound (III), one of the compounds of this invention, as follows:

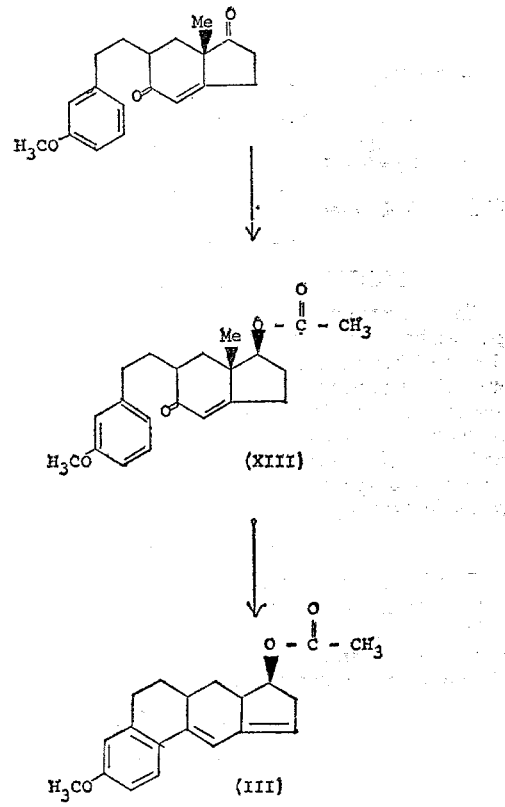

The compound (III) of this invention is an anti-androgen in that it opposes the action of testosterone or other androgens in the mammalian body. As an anti-androgen, this compound is useful in the treatment of certain physiological conditions in mammals characterized by high androgen blood level, such as prostatic hypertrophy, hirsuitism and the like.

In addition to being an anti-androgen as described above, compound (III) of this invention is also an intermediate in the preparation of compounds (I) and (II) of this invention. Thus, compound (II) can be produced from (III) by catalytic hydrogenation. Preferably, this hydrogenation reaction is carried out in two steps, using as a catalyst in the first step palladium on a barium carbonate carrier and in the second step, platinum on a carbon carrier. It is believed that the first step results in an intermediate (XIV) which is further hydrogenated in the presence of the platinum catalyst to form the desired product as illustrated below.

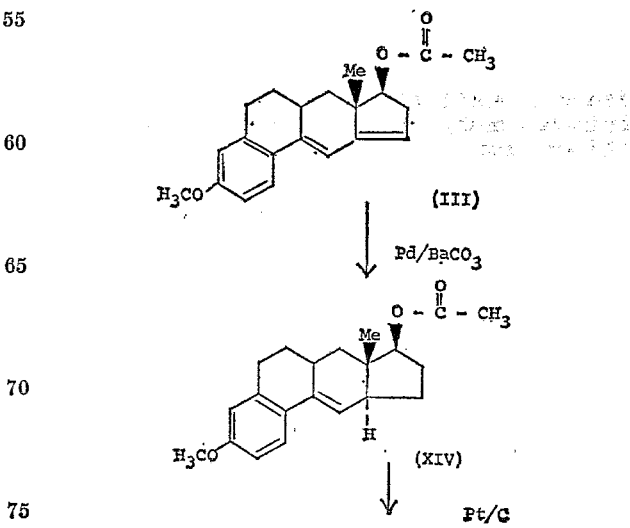

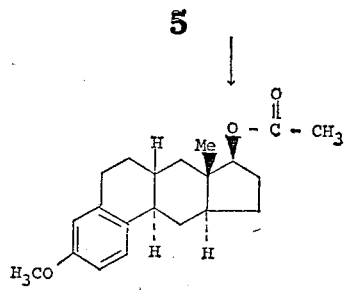

(II)

It has been found that compound (II) of this invention is an estrogen. As an estrogen, compound (II) is useful in mammals in the same way as the known estrogen, estrone or diethylstilbestrol.

In addition, compound (II) of this invention is useful as an intermediate in the preparation of compound (I) of this invention. Thus, compound (I) can be prepared from compound (II) by subjecting compound (II) to a Birch reduction using lithium wire and ammonia, and then reacetylating the product of the Birch reduction. The overall reaction is

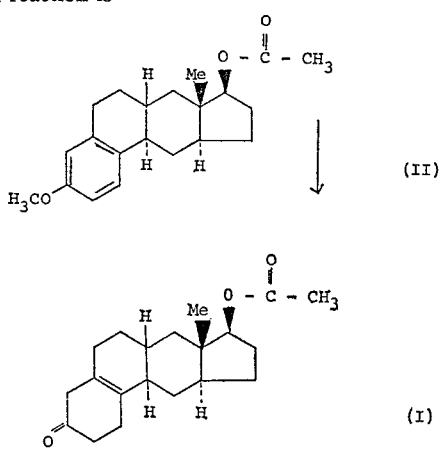

Compound (I) of this invention is an anti-estrogen. As an anti-estrogen, the compound is useful in mammals in treating conditions ascribable to hyperestrogenism, such as painful breast. In addition, since estrogen is necessary for the implantation of sperm in the uterus, the compound (I) is useful in contraception.

Having described the basic concepts of the invention, reference is now made to the following examples which are provided by way of illustration, and not of limitation, of the practice of the invention.

EXAMPLE 1

Preparation of Ketal (VII)

m-Methoxyphenylacetic acid (Aldrich Chemical Co.) is converted to m-methoxyphenethyl iodide using the procedure of H. Smith, supra, which is then used to alkylate the potassium salt of ethyl acetoacetate in accordance with the technique of Robinson (supra.) to produce compound (VI) in an 81% yield.

A solution of VI (91.0 g., 0.345 mole), ethylene glycol (27.2 g., 0.438 mole), and p-toluenesulfonic acid (0.8 g.) in toluene (400 ml.) was refluxed, collecting water in a Dean and Stark trap. After water evolution had ceased (5 hrs.), the cooled mixture was washed with aqueous sodium bicarbonate, water and dried over magnesium sulfate. The crude product VII (100.5 g., 94.5%) showed a single infrared carbonyl stretching band at 1740 cm.$^{-1}$. The NMR spectrum exhibited singlets at $$83(3H, CH_3-\overset{|}{C}=O)$$

and 225 cps. (3H, $CH_3OAr$), a triplet at 76 cps. (3H, J=7 cps., $O-CH_2-CH_3$), a quartet at 21 cps. (2H, J=7 cps., $O-CH_2-CH_3$), and multiplets attributable to aromatic, aliphatic and $O-CH_2-CH_2-O$ groupings.

The latter was a partially split singlet, the adjacent asymmetric center creating an $A_2B_2$ pattern. Although prolonged heat caused decomposition, a small sample distilled at 130–132° (0.07 mm.).

Analysis.—Calcd. m. wt. for $C_{17}H_{24}O_5$: 308.1624. Found: 308.1622.

EXAMPLE 2

Preparation of hydroxy ketal (VIII)

The crude ketal VII (94.0 g., 0.305 mole) prepared in Example 1 in dry tetrahydrofuran (150 ml.) was added dropwise to a stirred slurry of lithium aluminum hydride (12.9 g., 0.340 mole) in tetrahydrofuran (500 ml.), and the mixture was then heated at reflux for 18 hr. Water was added to the reaction mixture until the aluminum salts separated from the organic phase as a coagulated solid. Filtration through Celite, washing the precipitate thoroughly with chloroform, and concentration gave 71.0 g. (87%) of the crude alcohol VIII. The infrared spectrum (film) showed maxima at 3450 (OH), 2840 ($OCH_3$), 1605 and 1495 (Ar) cm.$^{-1}$, but no absorption in the carbonyl stretching region.

Analysis.—Calcd. m. wt. for $C_{15}H_{22}O_4$: 266.1518. Found: 266.1518.

EXAMPLE 3

Preparation of hydroxy ketone (IX)

The hydroxyketal VIII (71.0 g.) prepared in Example 2 was dissolved in 90% aqueous methanol (710 ml.) containing 37.5% hydrochloric acid (7.1 ml.). After 1 hr. at room temperature, t.l.c. indicated the reaction was complete. The solvent was evaporated in vacuo, and the residue extracted with methylene chloride. After drying and concentrating, the crude hydroxyketone IX (59 g., 100%) remained as an oil;

$$\nu_{max.}^{film} \ 3445, 1705 \ cm.^{-1}$$

The N.M.R. spectrum showed singlets at 129 (3H, $CH_3-CH=O$) and 226 (3H, $CH_3OAr$) cps., a doublet (2H, J=5 cps., $CH-CH_2-OH$) at 224 cps., and multiplets associated with the aromatic and other aliphatic protons.

Analysis.—Calcd. m. wt. For $C_{13}H_{18}O_3$: 222.1256. Found: 222.1252.

EXAMPLE 4

Preparation of vinyl ketone (X)

A solution of IX (59 g.) prepared in Example 3 in pyridine (450 ml.) was refluxed for 15 hours under nitrogen. T.l.c. indicated minimum conversion to XLII. Concentration and distillation through a 12 mm. Vigreux column at 0.15 mm. afforded 25.4 g. (46.5%) of X boiling at 113–116°. The infrared spectrum (film) showed absorption at 1675 (C=C—C=O), 1600 and 1485 (Ar) cm.$^{-1}$, and no maxima attributable to hydroxyl or saturated carbonyl groups. The N.M.R. spectrum showed singlets at 136 (3H, $CH_3-C=O$), 158 (4H, $$O=C-CH_2-Ar)$$

224 (3H, $CH_3O$), 342.5 (1H, =CH) and 358 (1H, =CH) cps., as well as a multiplet (4H) associated with the aromatic protons.

Analysis.—Calcd. for $C_{13}H_{16}O_2$: C, 76.44; H, 7.90. Found: C, 76.42; H, 7.81. Calcd. m. wt.: 204.1150. Found: 204.1144.

EXAMPLE 5

Preparation of compound (XII)

The vinyl ketone X (6.12 g.), prepared in Example 4, 2-methylcyclopentane-1,3-dione (5.04 g., 1.5 mole equiv.) and a half of a pellet of potassium hydroxide in n-butanol (10 ml.) were stirred and refluxed under nitrogen for 40 hours, when t.l.c. showed the virtual absence of starting material. The reaction mixture was diluted with benzene and filtered to remove unchanged dione. The filtrate was washed with aqueous sodium bicarbonate and the washings back-washed with benzene. The combined organic phase was washed with 10% aqueous hydrochloric acid, water, and then dried and concentrated in vacuo. The residual oil in xylene (50 ml.) containing benzoic acid (1.9 g.) and triethylamine (1.85 ml.), was refluxed under nitrogen for four days, collecting water evolved in a Dean and Stark trap. The reaction mixture was then diluted with benzene and washed with 10% aqueous hydrochloric acid, aqueous sodium bicarbonate and water. After drying and concentrating, the residual oil was crystallized from ether (50 ml.), to give 2.0 g. (22%) of XII as off-white crystals, M.P. 125–127.5° (capill.). Recrystallization from methanol raised the melting point to 128.5–130°;

$\nu_{max}^{CHCl_3}$ 2840 (OMe), 1745 (C=O), 1665 (C=C—C=O) 1600 and 1485 (Ar) cm.$^{-1}$; $\lambda_{max}^{EtOH}$ 279 (2310), 272 (2430), 235 sh. (11000), 221 (15900) m$\mu$ The NMR spectrum showed singlets (3H) of 76

(CH$_3$—C)

and 227 (CH$_3$—O) cps., a broader singlet (1H) at 358 (C=CH—C=O) cps., a low field multiplet (4H, Ar) and a methylene envelope from 90 to 190 cps.

*Analysis.*—Calcd. for $C_{19}H_{22}O_3$: C, 76.48; H, 7.43. Found: C, 76.33; H, 7.47. Calcd. m. wt.: 298. Found: 298.

EXAMPLE 6

Preparation of 8-acetoxy compound (XIII)

Sodium borohydride (0.45 g., 11.9 mmole) in ethanol (100 ml.) was added dropwise to a stirred solution of XII (3.55 g., 11.9 mmole) prepared in Example 5 in tetrahydrofuran. After t.l.c. indicated the reaction was complete (about 2 hours), the excess borohydride was destroyed with acetic acid. The reaction mixture was then treated with sodium bicarbonate (c. 5 g.) and water (20 ml.) and concentrated in vacuo. The product was extracted with benzene and then chloroform, dried over magnesium sulfate, and concentrated to leave 3.829 g. of XIII as a viscous non-crystallizable oil, essentially pure as judged by t.l.c.;

$\nu_{max}^{film}$ 3430, 1660

The NMR spectrum showed singlets of 66.5 cps. (3H, C—CH$_3$), 221 cps. (3H, OCH$_3$), 347 (1H, CH=C), an undefined multiplet centered at 250 cps. (W$^{1/2}$ 8 cps., 1H, CH—OH), and multiplets attributable to the remaining aliphatic and aromatic protons.

*Analysis.*—Calcd. m. wt. for $C_{19}H_{24}O_3$: 300.1725. Found: 300.1723.

The crude product in pyridine (5 ml.) was treated with acetic anhydride (5 ml.) and, after standing overnight, the volatiles were evaporated in vacuo. T.l.c. of the residual oil (4.04 g.) showed that acetylation was complete;

$\nu_{max}^{film}$ 1740, 1670 cm.$^{-1}$

The NMR spectrum showed singlets at 64 cps.

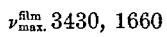

121 cps. (3H, O—CO—CH$_3$), 221 cps. (3H, OCH$_3$) and 343 cps. (1H, CH=C), a triplet centered at 284 cps. (1H, J=8 cps. CH—OAc), in addition to multiplets attributable to the remaining aromatic and aliphatic protons.

*Analysis.*—Calcd. m. wt. for $C_{21}H_{26}O_4$: 342.183. Found: 342.184.

EXAMPLE 7

Preparation of phenanthrene-8-ol acetate (III)

A solution of the acetate XIII prepared in Example 6 (2.019 g.) in benzene (12 ml.) was added to a stirred mixture of phosphorus pentoxide (4.62 g.) and phosphoric acid (s.g. 1.7, 6.5 ml.), and then refluxed under nitrogen for 30 min. The reaction mixture was diluted with more benzene, and washed with aqueous sodium bicarbonate until neutral, before drying and concentrating in vacuo. Elution from silica gel with chloroform, followed by crystallization from acetone, afforded 1.495 g. of III, M.P. 131–133° (capill.). Yield (based on XII) 38%;

$\nu_{max}^{CHCl_3}$ 1730, 1250 cm.$^{-1}$ (OAc), 1605, 1495 cm.$^{-1}$ (aromatic); $\lambda_{max}^{EtOH}$ 315 m$\mu$ (infl., $\epsilon$ 22,000) 302 m$\mu$ ($\epsilon$ 29,600), 295 m$\mu$ (infl., $\epsilon$ 28100)

The NMR spectrum showed singlets at 61 Hz. (3H, CH$_3$—C), 126 Hz. (3H, CH$_3$—CO—O), 228 Hz. (3H, CH$_2$OAr), and 400 Hz. (Ar—CH=C—), a doublet at 303 Hz. (1H, J=8 Hz., CH—OAc), a triplet at 326 Hz. (1H, W$^{1/2}$ 7 Hz., —CH—CH=C), and the remaining aromatic protons (395–415 Hz.) and aliphatic protons (70–190 Hz.) as multiplets.

*Analysis.*—Calcd. for $C_{21}H_{24}O_3$: C, 77.75; H, 7.46. Found: C, 77.85; H, 7.50. Calcd. m./e. 324.1725; Found: 324.1714.

EXAMPLE 8

Determination of anti-androgenic activity of compound (III)

In determining the anti-androgenic activity of compound III of this invention, three groups of 21-day old male rats are castrated and treated for seven days. The first control group is injected once daily with 0.1 ml. of the vehicle to be used with the test compound, and the second control group receives a daily dose of 0.1 or 0.2 mg. of testosterone for the seven-day test period.

The third group receive a daily injection of the compound under test at varying dosages, and a daily injection of 0.1 or 0.2 mg. of testosterone.

One day following the last injection the rats are killed and autopsied, and the weights of the seminal vesicles, ventral prostrate, levator ani and preputial glands are recorded. The anti-androgenic activity is determined by calculating the degree of inhibition of testosterone-induced hypertrophy of the aforementioned sex accessories.

5,6,6a,7,7a,9-hexahydro - 3 - methoxy-7a-methyl-8H-cyclopenta<b>phenanthrene-8-ol acetate is tested using the above procedure. The mean percent inhibitions for six test animals are shown in the following table:

|   | Percent inhibition |
|---|---|
| Seminal vesicles | 47 |
| Ventral prostrate | 46 |
| Levator ani | 20 |
| Preputial glands | 56 |

EXAMPLE 9

Preparation of 8-$\beta$-acetoxy, 6,6a$\beta$,7,7a,8,9,10,10a$\alpha$,11, 11a$\alpha$ - decahydro - 3 - methoxy-7a$\beta$-methyl-5H-cyclopenta<b>phenanthrene A mixture of 10% palladium on barium carbonate (30 mg.) and III (30 mg.) in benzene (300 ml.) was stirred under a hydrogen atmosphere. When glc analysis indicated conversion of III to the dihydro product XIV was optimum, relative to the formation of tetrahydro products (10%), the hydrogenation was stopped (6 hr.). The catalyst was filtered, the solvent was evaporated, and the crude product was crystallized from methanol, to give 148 mg. of XIV, M.P. 95–103° (capill.). The NMR spectrum showed singlets (3H) at 51 (—C—CH$_3$), 123

(O·CO·CH$_3$)

and 226 Hz. (OCH$_3$), a triplet at 287 Hz. (J=8 Hz. 1H, CH·OAc), a broad singlet (W$^{1/2}$ 2.5 Hz., 1H, CH=C), a doublet (J=7 Hz., 1H, CH$_3$—O—C=CH—CH), at 451 Hz., and the remaining aromatic protons (395–412 Hz.) and aliphatic protons (70–190 Hz.) as multiplets.

$\nu_{max}^{CCl_4}$ 1740, 1245 cm.$^{-1}$; $\lambda_{max}^{EtOH}$ 265 nm. (18,500)

When hydrochloric acid was added to an ethanolic solution of XIV, the absorption maxima changed to 272 nm. (15,600).

A mixture of XIV (117 mg.) and 5% platinum on carbon (100 mg.) in benzene (100 ml.) was stirred in a hydrogen atmosphere until uptake of the gas was complete. The catalyst was filtered, and the solvent evaporated to leave a residual oil, which was shown by glc to compound II (87%) M.P. 117–118°.

EXAMPLE 10

Determination of estrogenic activity of 8-$\beta$-acetoxy, 6,6a$\beta$, 7,7a,8,9,10,10a$\alpha$,11,11a$\alpha$-decahydro - 3 - methoxy-7a$\beta$-methyl-5H-cyclopenta$<$b$>$phenanthrene In determining the estrogenic activity of this compound of the invention, tests are carried out using the procedures described by Reuben et al., Endo., 49, 429 (1951). Thus, immature female mice are divided into three groups. The mice in one group serve as control, while the mice in the second group are injected with the compound under test in a dose of 200 mcg. for three days. The third group of mice are injected with 0.3 mcg. of estrone to insure that the mice respond to the test, and thus serves as a positive control group.

The estrogenic activity appears as an increase in the uterine weight of the treated mice as compared to the untreated mice.

Using the foregoing procedure for compound (II) of this invention, it is found that the mean increase in uterine weight of the mice treated with compound (II) as compared to the untreated control group was 13.722 mg. for nine test mice.

EXAMPLE 11

Preparation of 8$\beta$-acetoxy, 4,5,6,6a$\beta$,7,7a$\beta$,8,9,10,10a$\alpha$,11, 11a$\alpha$ - dedecahydro - 7a - methyl - 1H - cyclopenta$<$b$>$phenanthrene-3(2H)-one Lithium wire (120 mg.) was added to a stirred mixture of II (93 mg.) in ether (25 ml.) and redistilled ammonia (25 ml.). After 15 minutes, ethanol (2 ml.) was added in portions over a period of 15 min. After the ammonia had evaporated, water (30 ml.) was added and the ether layer was separated. The aqueous layer was extracted with ether (3× 50 ml.), and the combined ethereal phase was washed with water and dried over magnesium sulfate. The ether was evaporated, and the residue was treated with methanol (15 ml.) and oxalic acid dehydrate (230 mg.) in water (3 ml.). After 1 hour, when t.l.c. showed conversion to a new product was complete, the mixture was made basic with aqueous sodium bicarbonate, and the product was extracted with ether (3× 50 ml.). The combined ether extracts were washed with water and dried over magnesium sulfate. The solvent was evaporated and the residual oil was treated with acetic anhydride (1 ml.) and pyridine (2 ml.). After 4 hours, glc showed esterification was complete, and the reagents were evaporated in vacuo. The residue is eluted from silica gel with 2.5% ethyl acetate in methylene chloride, to give 44 mg. of the product 1; M.P. (evacuated capill.) 148.5–150°;

$\nu_{max.}^{CS_2}$ 1740–1730, 1255 cm.$^{-1}$

The NMR spectrum showed signals at 50 Hz. (3H, c., C—CH$_3$), 122.5 Hz. (3H, s., O·CO·CH$_3$), 146.5 Hz. (4H, s., W$^{1/2}$ 4 Hz., =C—CH$_2$—CH$_2$—C=O), 165 Hz. (2H, s., W$^{1/2}$ 6 Hz.) and 282 Hz. (1H, t., J=6 Hz. CHOAx).

*Analysis.*—Calcd. m./e. for C$_{20}$H$_{28}$O$_3$: 316.2038. Found: 316.2037.

EXAMPLE 12

Determination of anti-estrogenic activity of 8$\beta$-acetoxy, 4,5,6,6a$\beta$,7,7a$\beta$,8,9,10,10a$\alpha$,11,11a$\alpha$ - dodecahydro - 7a-methyl-1H-cyclopenta$<$b$>$phenanthrene-3(2H)-one In determining the anti-estrogenic activity of compound (I) of this invention, tests are carried out based upon the procedure of Edgren and Calhoun, Proc. Soc. Exptl. Biol., 94, 537–539, (1957). Thus, the tests are carried out in an identical manner as described by Edgren et al., except that the compound tested is injected into the mouse in the same doses with 0.3 mcg. of estrone.

Immature female mice are divided into groups of ten animals each: a first group of ten mice are injected subcutaneously with 200 mcg. of compound (I) and 0.1 mcg. of estrone in 0.1 cc. of corn oil daily for three days, and a second group of ten mice are injected with 100 mcg. of compound (I) and 0.1 mcg. of estrone in the same carrier daily for three days. A third group of ten mice are injected with 0.1 mcg. of estrone in 0.1 cc. of corn oil daily for three days as a positive control group. The anti-estrogenic activity of the compound under test appears as a decrease in the response of the mice injected with the compound under test to the estrogenic effect of the estrone. Thus, an anti-estrogen results in a decrease in the uterine weight in the test groups as compared to the weight of the control group receiving estrone alone.

Compound (I) of this invention is tested using the foregoing procedure. The mean percent inhibition of the effects of estrone are shown in the following table:

| Mc. dose: | Percent inhibition |
|---|---|
| 200 | 31.582 |
| 100 | 47.572 |

It will be apparent that various changes and modifications can be made in the details of formulation, procedure and use without departing from the spirit of the invention, especially as defined in the following claims.

I claim:

1. A compound of the formula:

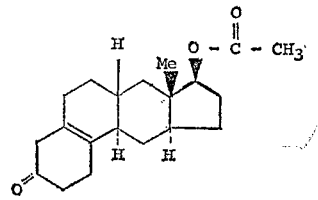

2. A compound of the formula:

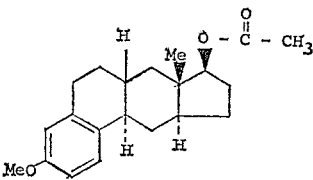

3. A compound of the formula:

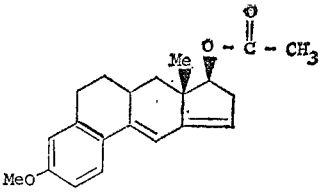

References Cited

UNITED STATES PATENTS

| 3,459,778 | 8/1969 | Hughes et al. | 260—488 |
| 3,478,062 | 11/1969 | Amiard et al. | 260—488 |
| 3,519,677 | 7/1970 | Jager | 260—488 |

JAMES A. PATTEN, Primary Examiner

V. GARNER, Assistant Examiner

U.S. Cl. X.R.

260—340.9, 473 R, 488 CD, 491, 590, 613 R; 424—311